United States Patent [19]
Middlebrook

[11] Patent Number: 5,930,809
[45] Date of Patent: Jul. 27, 1999

[54] SYSTEM AND METHOD FOR PROCESSING TEXT

[76] Inventor: R. David Middlebrook, 47 Hemlock Cir., Princeton, N.J. 08540

[21] Appl. No.: 08/936,149

[22] Filed: Sep. 22, 1997

Related U.S. Application Data

[63] Continuation-in-part of application No. 08/655,699, Jun. 3, 1996, Pat. No. 5,713,740, which is a continuation-in-part of application No. 08/184,493, Jan. 18, 1994, Pat. No. 5,556,282.

[51] Int. Cl.$^6$ ........................................... G09G 5/34
[52] U.S. Cl. .................. 707/501; 345/341; 345/345; 345/346; 345/123
[58] Field of Search .................... 345/973, 341, 345/123, 339, 340, 124, 115, 116, 346; 707/501

[56] References Cited

U.S. PATENT DOCUMENTS

| | | | |
|---|---|---|---|
| 4,975,690 | 12/1990 | Torres | 340/721 |
| 5,023,851 | 6/1991 | Murray et al. | 368/41 |
| 5,339,391 | 8/1994 | Wroblewski et al. | 395/157 |
| 5,680,561 | 10/1997 | Amro et al. | 395/341 |
| 5,757,370 | 5/1998 | Amro et al. | 345/341 |
| 5,855,015 | 12/1998 | Shoham | 707/5 |
| 5,867,678 | 2/1999 | Amro et al. | 345/347 |

*Primary Examiner*—Jessica J. Harrison
*Assistant Examiner*—David A. Fleming
*Attorney, Agent, or Firm*—LaMorte & Associates

[57] ABSTRACT

A system and method which enables individuals to manipulate text retrieved by a computer in such a manner that the computer user can rapidly and accurately obtain information about the contents of a retrieved body of text without reading the text. If a computer retrieves text that is too large to display on a single computer screen, the present invention creates a map box on the computer screen. The map box is displayed along with a portion of the retrieved text. Within the map box is displayed a representation of the entire body of text. Using a screen icon, a user can point to any place in the representation of the body of text. The portion of the body of text pointed to then becomes displayed on the computer screen. Furthermore, the representation of the text in the map box can be mapped in different ways to help inform the computer user as to the contents of the body of text prior to that text being read.

16 Claims, 6 Drawing Sheets ously only a small portion of that text is displayed on the computer screen at one time. The reason for this is that if the entire text were shown at once, the font size would be too small and the text would not be readable. As a result, a person who has retrieved a large body of text must either scroll through each line of the text or page down through the text from its beginning to its end.
5,930,809

SYSTEM AND METHOD FOR PROCESSING TEXT

RELATED APPLICATIONS

This application is a continuation-in-part of U.S. patent application Ser. No. 08/655,699, filed Jun. 3, 1996, now U.S. Pat. No. 5,713,740, by the inventor herein and entitled SYSTEM AND METHOD FOR CONVERTING WRITTEN TEXT INTO A GRAPHICAL IMAGE FOR IMPROVED COMPREHENSION BY THE LEARNING DISABLED, which was a continuation-in-part of U.S. patent application Ser. No. 08/184,493, filed Jan. 18, 1994, now U.S. Pat No. 5,556,282, by the inventor herein, entitled METHOD FOR THE GEOGRAPHICAL PROCESSING OF GRAPHIC LANGUAGE TEXTS.

BACKGROUND OF THE INVENTION

1. Field of the Invention

The present invention relates to systems and methods which enable individuals to manipulate and accurately obtain information about the contents of a body of text without having to read the entire body of text.

2. Prior Art Statement

When a large amount of text is retrieved by a computer, typically only a small portion of that text is displayed on the computer screen at one time. The reason for this is that if the entire text were shown at once, the font size would be too small and the text would not be readable. As a result, a person who has retrieved a large body of text must either scroll through each line of the text or page down through the text from its beginning to its end.

When a computer user retrieves text, he/she often would like to know how long that body of text is prior to that person reading the text. One common prior art approach to this problem is to provide the computer user with a positional slider-bar adjacent to the retrieved text. Referring to FIG. 1, a typical prior art computer screen 10 is shown containing a positional slider-bar 12. When a portion of a body of text 14 is retrieved onto the computer screen 10, a positional slider-bar 12 is displayed at either the right or left boarder of the computer screen 10. The positional slider-bar 12 has a length L that represents the overall length of the retrieved body of text 14. The top end 18 of the positional slider-bar corresponds to the beginning of the retrieved body of text 14 and the bottom end 20 of the positional slider-bar 12 corresponds to the end of the retrieved body of text 14. A position indicator 22 is disposed at some point on the positional slider-bar 12 in between the top end 18 and the bottom end 20. The position indicator 22 shows the computer user what part of the body of text 14 is currently being displayed on the computer screen 10. In the shown example, the position indicator 22 is located at a point at the center of the positional slider-bar 12. As such, the computer user knows that he/she is currently viewing a segment of text located in the middle of the retrieved document.

In such prior art text viewing systems, a person can move a screen icon 23 to the position indicator 22 on the positional slider-bar 12 and can move position indicator 22 up and down on the positional slider-bar 12 with the screen icon 23. The text displayed on the computer screen 10 corresponds to the location of the position indicator 22 on the positional slider-bar 12. As a result, by moving the position indicator 22 to the top end 18 of the positional slider-bar 12, the text displayed on the screen 10 automatically scrolls to the beginning of the retrieved body of text 14. Similarly, if the position indicator 22 is moved to the bottom end 20 of the positional slider-bar 12, the text displayed on the screen 10 automatically scrolls to the end of the retrieved body of text 14.

Such prior art text viewing systems typically are not helpful in informing a user as to the length of a body of text 14. This is because the positional slider-bar 12, which is always the same size, regardless of the length of the text, does not include any information concerning scale. Furthermore, such prior art text viewing systems do not provide the user with any useful information regarding what is actually contained within the body of text 14. For instance, the prior art positional slider-bar 12 does not inform a user as to the number, relative length, and location of different paragraphs in the body of text 14 or the presence of charts, graphs, sideboxes, pictures or other related information in the body of text 14. As such, a user is unable to scan the contents or layout of the retrieved body of text 14 without first scrolling through the entire body of text 14.

A need therefore exists in the prior art for a text viewing system and method that would inform a computer user as to certain details of a retrieved body of text without having to scroll through the entire body of text. Such a system would improve a users understanding of the text, thereby leading to improved reading proficiency and comprehension.

SUMMARY OF THE INVENTION

The present invention is a system and method which enables individuals to manipulate text retrieved by a computer in such a manner that the computer user can rapidly and accurately obtain information about the contents of a retrieved body of text without reading the text. If a computer retrieves text that is too large to display on a single computer screen, the present invention creates a map box on the computer screen. The map box is displayed along with a portion of the retrieved text. Within the map box is displayed a representation of the entire body of text. Using a screen icon, a user can point to any place in the representation of the body of text. The portion of the body of text pointed to then becomes displayed on the computer screen. Furthermore, the representation of the text in the map box can be mapped in different ways to help inform the computer user as to the contents of the body of text prior to that text being read.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Figure 1:
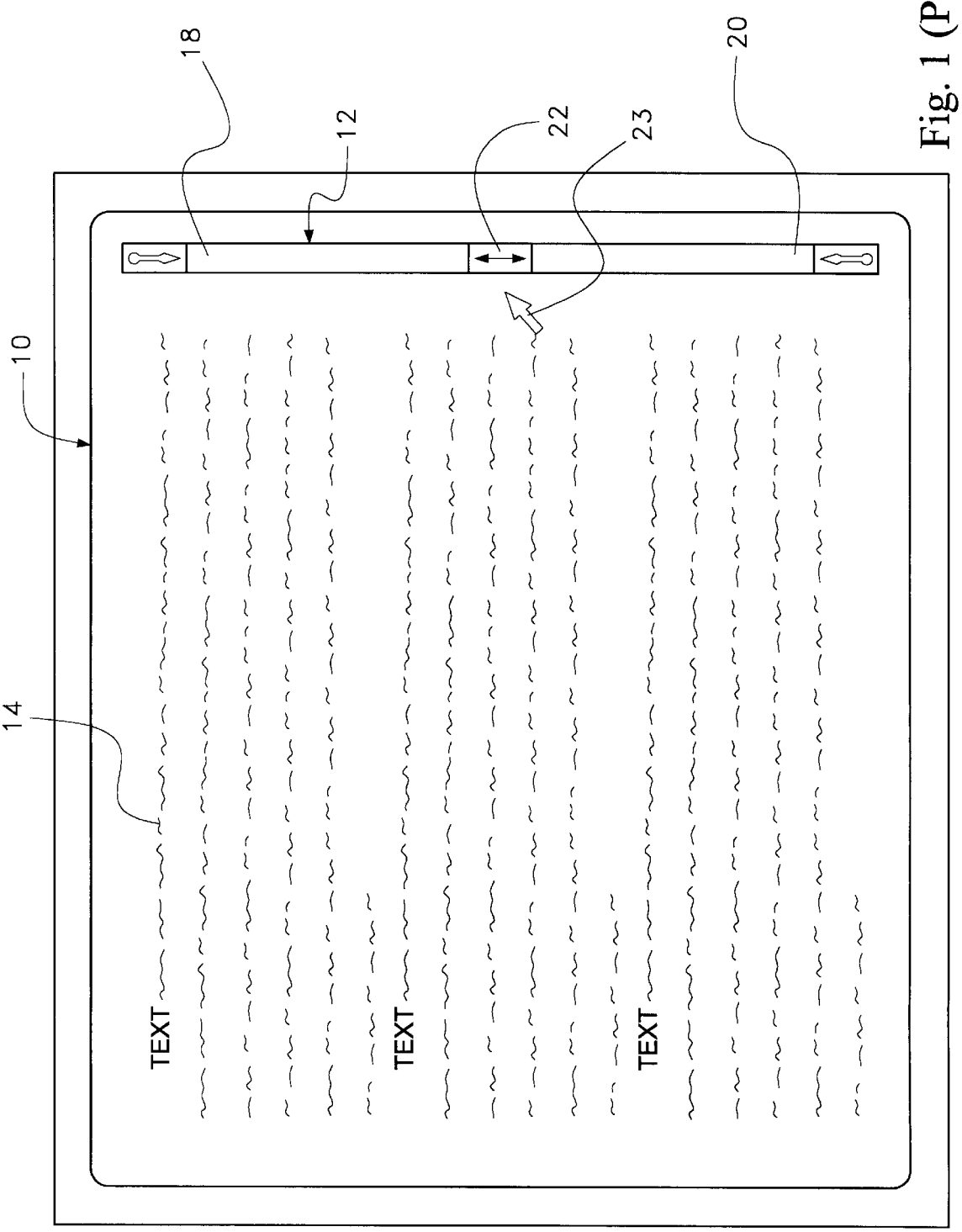
FIG. 1 shows a computer screen of a computer that is running a prior art text viewing system.
Figure 2:
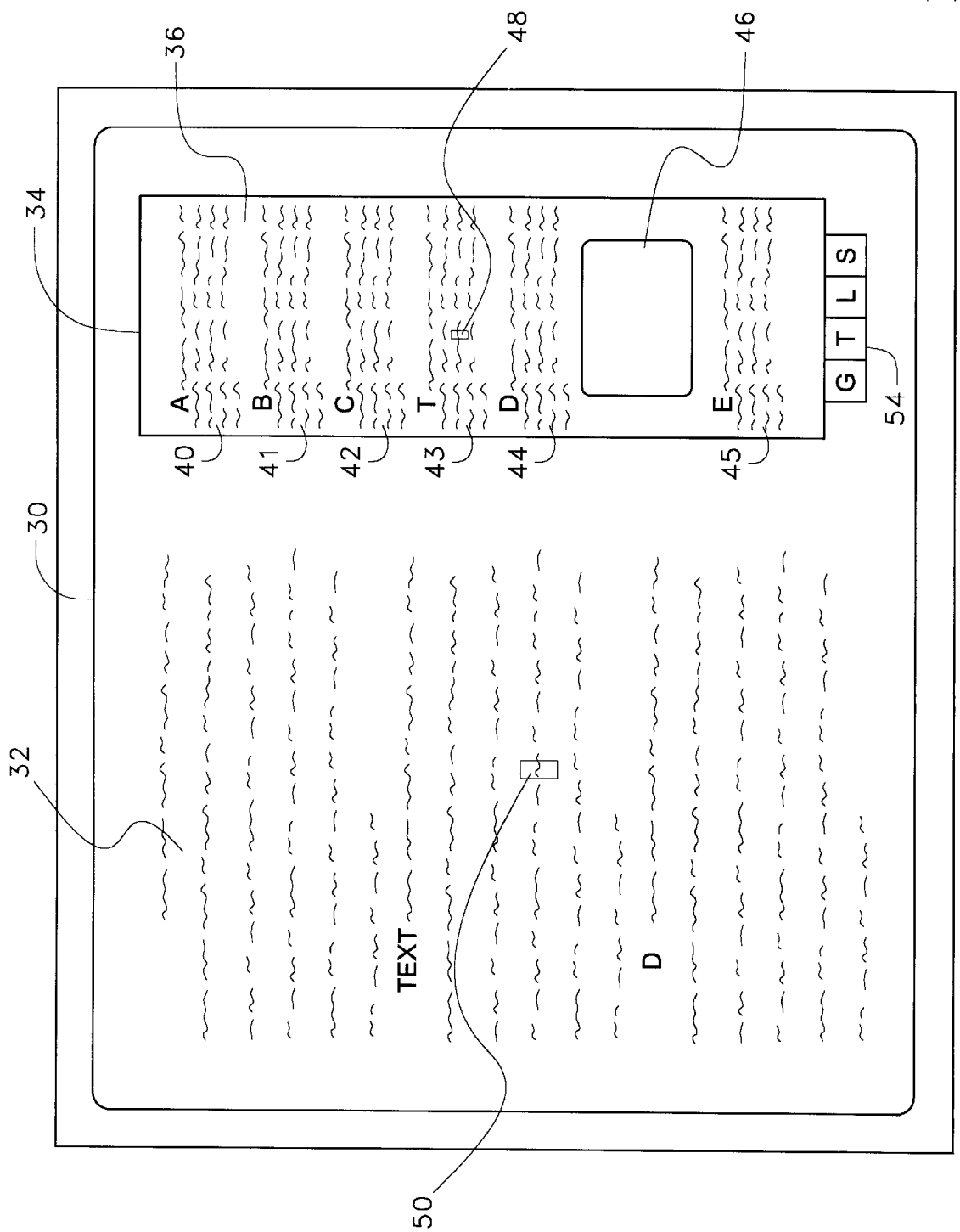
FIG. 2 shows a computer screen showing text and a base typographic mapping of the text in accordance with the present invention.

Referring to FIG. 2, a computer screen 30 using the present invention system and method of processing text is illustrated. The computer screen 30 shows a segment of a larger body of retrieved text 32. The body of text 32 can come from any source. For example, the body of text 32 can be text that is written by the computer user, downloaded from a memory disk, scanned into the computer or retrieved via a modem connection with an external data source. In the example shown, the retrieved body of text 32 is too large to be displayed in a normal font on just one computer screen. As such, a user cannot see the entire body of text 32 if not for the present invention system and method.

In accordance with the present invention, a map box 34 is provided along one of the vertical edges of the computer screen 30. Contained within the map box 34 is a base typographic map 36 of the entire body of text 32 from its beginning word to its last word. The base typographic map 36 is created by reproducing the entire body of text 32 in a font small enough fit the entire body of text 32 within the map box 34. Depending upon the size of the body of text 32, the font needed to reproduce the entire body of text 32 within the map box 34 often makes the reduced text within the map box 34 unreadable. This is of no concern because the general map 36 containing the reduced body of text is not intended to be read. Rather, reduced text within the general map 36 is intended to enables a viewer to recognize the overall length of the retrieved body of text 32 as well as the layout and physical characteristics of the body of text 32, as taken as a whole.

In FIG. 2, the base typographic map 36 of the body of text 32 indicates to a viewer that the retrieved body of text 32 has six paragraphs 40, 41, 42, 43, 44, 45. The retrieved body of text 32 also contains a picture 46 located between the fifth paragraph 44 and the sixth paragraph 45. Although the words contained within the base typographic map 36 can not be read, a viewer can obtain a great deal of information from the base typographic map 36. For instance, a person viewing the base typographic map 36 can see the overall length of the body of text 32. That person can also see how many paragraphs are contained within the body of text 32 and how large each paragraph is in relation to the others. Additionally, the viewing person can tell how many pictures are present and where those pictures fit with respect to the text.

In the shown example, the first letter of each of the six paragraphs 40, 41, 42, 42, 44, 45 is viewable. Typographers commonly use oversized alphabetic characters to mark points of transition within a body of text. As such, even with the degree of reduction present in the base typographic map 36, oversized letters and/or words may still be readable.

A position icon 48 is used in the base typographic map 36 to show a viewer the point in the overall body of text 32 that is currently being displayed in an ordinary font on the computer screen 30. The position icon 48 can be the screen icon associated with a computer mouse. The position icon 48 on the base typographic map 36 corresponds to the position of a screen curser 50 in the ordinarily displayed body of text 32. For example, in the shown embodiment, the screen curser 50 is located in the middle of the third line of the fourth paragraph 43. Accordingly, the position icon 48 on the base typographic map 36 is also located in the middle of the third line of the fourth paragraph 43. As the screen curser 50 is moved on the ordinary text, the position icon 48 moves in a corresponding manner on the base typographic map 36.

The position icon 48 within the base typographic map 36 can be moved using a mouse, keyboard commands, a screen wand or a touch screen. As the position icon 48 is moved within the base typographic map 36, the displayed text on the computer screen 30 changes in a corresponding manner. For instance, if the position icon 48 is moved to the first paragraph of base typographic map 36 within the map box 34, then the text displayed on the computer screen 30 changes to show the area of text containing the first paragraph. Similarly, if the position icon 48 is moved to the picture 46 within the base typographic map 34, then that picture 46 becomes displayed in the computer screen 30.

In a few instances, a body of text 34 may be so large that if the entire text were displayed in the map box 34, the paragraph breaks and images may be too small to recognize in the base typographic map 36. If that scenario occurs, more than one map box can be used. Furthermore, if needed, only sections of the overall body of text can be presented in the map box 34. The sections presented in the map box 34 would then change as a user advances to different points in the overall body of text 32. In a preferred method of operation, the entire body of text 32 would be displayed in a base typographic map 36. The user can then selection sections of the complete base typographic map 36 to enlarge in a second larger scale map (not shown). The larger scale map can be displayed in a second map box (not shown) or can be selectively switched with the complete base typographic map 36 in the primary map box 34.

Figure 3:
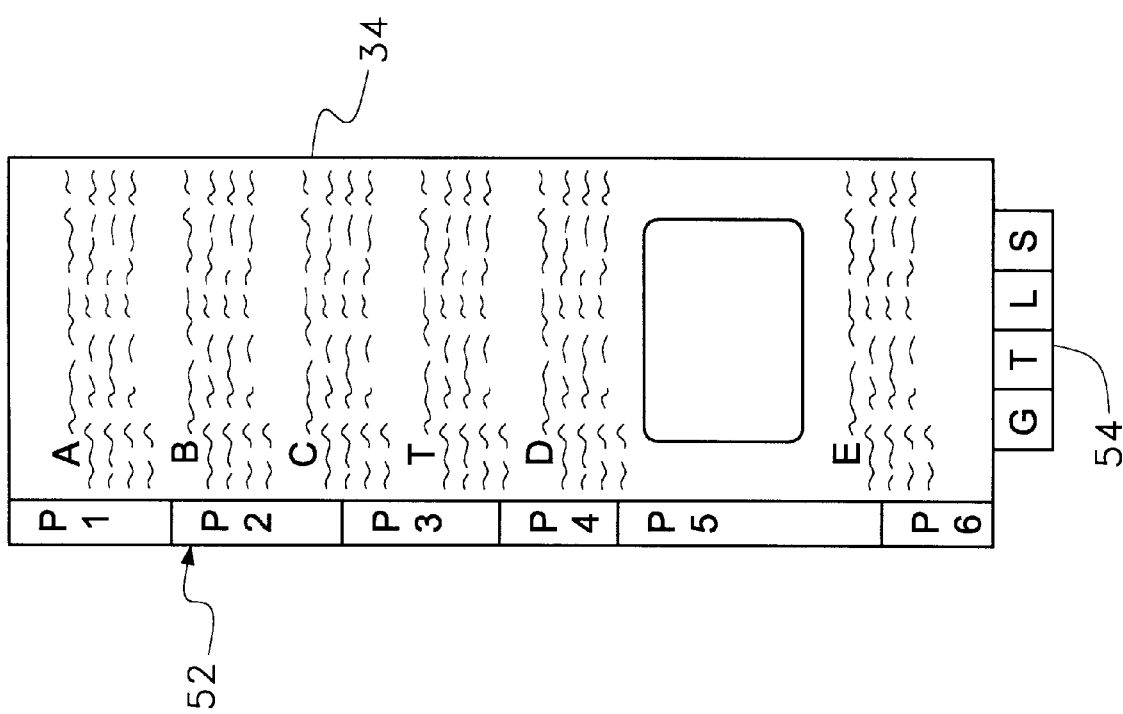
FIG. 3 shows an enlarged view of a modified version of the base typographic mapping previously shown in FIG. 2.

Referring to FIG. 3 a modification of the map box 34 of FIG. 2 is shown. In FIG. 3, a page number indicator 52 is present. The page number indicator 52 can be selectively created by a user by entering the proper keyboard function command or addressing a menu with a screen icon. The page number indicator 52 informs the user as to what pages different sections of the text occur. In this manner, a user can see how many pages the fully body of text occupies and what sections of the text fall on each page.

Figure 7:
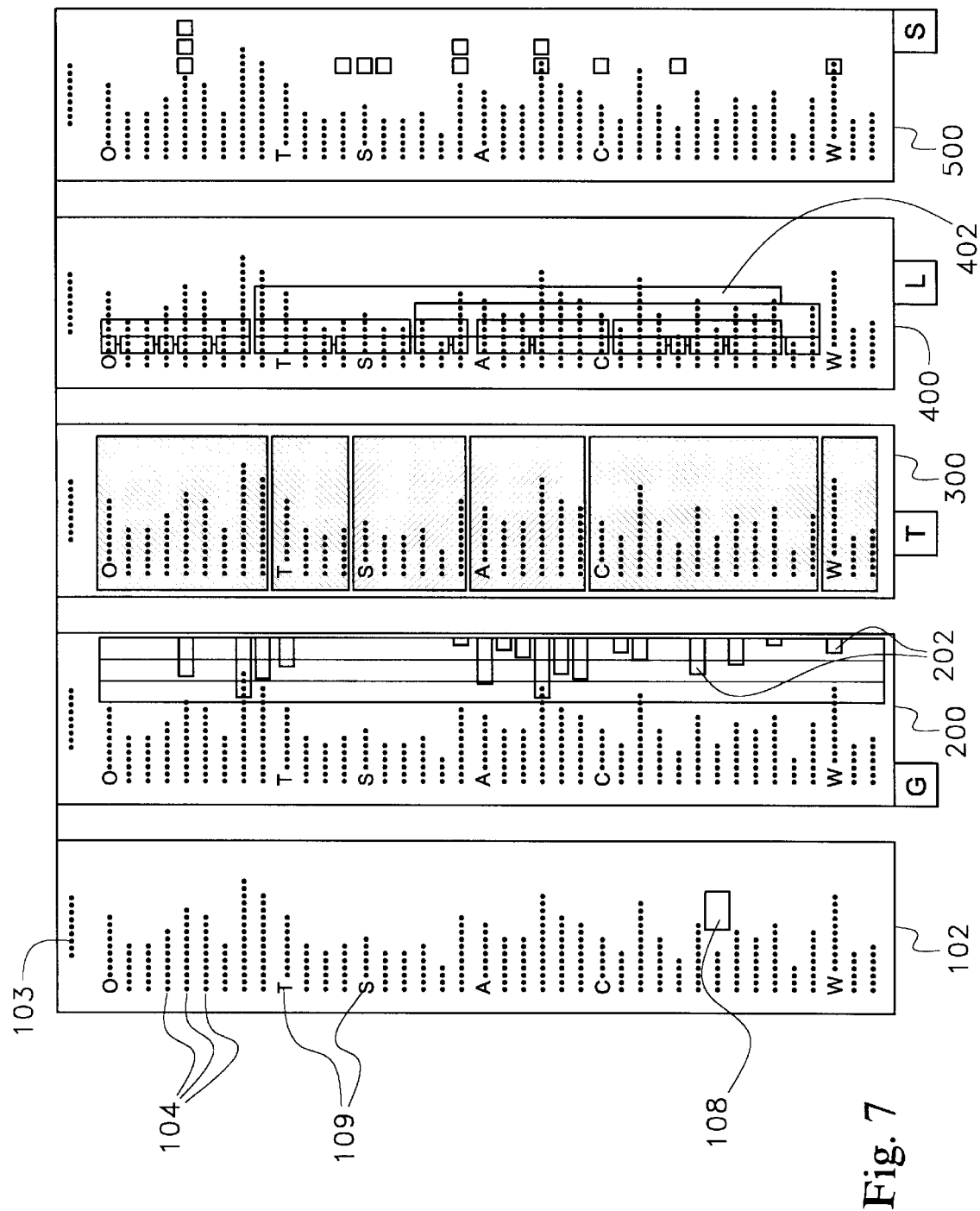
FIG. 7 provides a simultaneous showing of a base typographic mapping, a gistscape mapping, a typoscape mapping, a lexiscape mapping and a searchscape mapping for an alternate body of text.

Returning to FIG. 2, it can be seen that a four choice menu 54 is positioned at the bottom edge of the map box 34. In the choice menu 54 are the letters "G", "T", "L" and "S", by way of example. In the illustrated embodiment, the letter "G" stands for "GISTSCAPE" and is intended to produce the Gistscape mapping (200 in FIG. 7, provides an example of a Gistscape mapping created for a different text), which is one preferred embodiment might be displayed as an overlay to the base typographic map 36 in the map box 34 that has already been explained. Such a base typographic map 36 gives a user the general gist of the body of text 32 based upon a statistical analysis of the words in the text.

Figure 4:
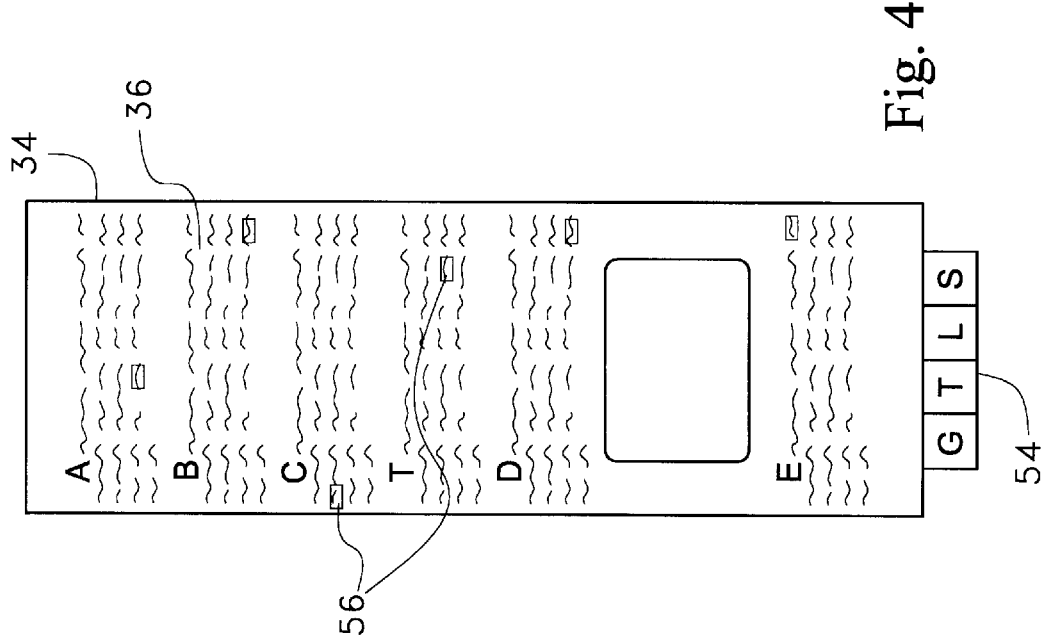
FIG. 4 shows an enlarged view of a detail typographic mapping of the text in accordance with the present invention.

The "S" selection in the choice menu stands for "SEARCHSCAPE". When a screen icon is moved to the "S" section of the choice menu 54 and is activated, the user is provided with the opportunity to type in a search query. The search query can contain any sequence of characters and may or may not contain wildcard characters. Search algorithms of this type are well known and used in the art of electronic text processing. Referring to FIG. 4, the map box 34 is shown after a user has selected the search option from the choice menu 54 and has entered a search inquiry. In the map box 34 a position indicator 56 appears at all the points in the base typographic map 36 that correspond the occurrence of the search inquiry in the body of text 32 (FIG. 2).

The user then needs only move a screen icon to each of the position indicators 56 and the section of text containing the search inquiry will be displayed.

The "L" in the choice menu stands for "LEXISCAPE" and the "T" in the choice menu stands for "TEXTSCAPE". Both the lexiscape feature and the textscape feature are used to help a user understand the contents of the body of text 32 without reading all of the words contained within the body of text 32. The principles of Gistscape mapping and Textscape mapping are described in U.S. patent application Ser. No. 5,713,740, filed Jun. 3, 1996 and entitled SYSTEM AND METHOD FOR CONVERTING WRITTEN TEXT INTO A GRAPHICAL IMAGE FOR IMPROVED COMPREHENSION BY THE LEARNING DISABLED, which is herein incorporated into this disclosure by reference.

The purpose of obtaining one or more mappings of a text-such as a Searchscape mapping, Gistscape mapping, Textscape mapping, or Lexiscape mapping is to illustrate and provide insight about the structure and content of the text with regard to one or more selected features. Individuals can perceive the mappings of the body of text using parafoveal and peripheral vision, peripheral vision, and process the mappings using visual/spacial cognitive abilities. The various mappings therefore enables a person to understand a large amount of information about the body of written text without reading the words comprising the body of written text. The image of the text is then mapped in various ways to illustrate, without words, the various features of the text that provide insight into the contents of the text. By reading one or more mappings of a body of text, a person may learn a great deal about the organization and context of the text without reading the text, in the same way that a person can learn about a city by viewing different types of maps for the same city. For example, by reading a topographic map, road map, bus route map, tourism map, tax map and political precinct map for a city, a person can learn about the size of a city, the important parts of the city, the business sections and residential sections of the city and the like without ever having to read text describing the city. As will be explained, by viewing different mappings of a body of text, a person is able to tell what a given body of text is about, what parts of the text address different topics, how large the body of text is, and a great deal of other information about the body of text.

A lexiscape mapping is created by statistically analyzing the grammatical features of the body of text to find target terms that are essential in understanding the body of text. The primary factors used in creating a lexiscape are the frequency and location of target terms. Secondary factors include the graphic attributes, phonetic attributes, meaning and usage of the target terms.

The primary factor of frequency refers to the number of times a target term appears in a body of text. Frequency may be expressed in terms of a number, a percentage or a ratio. The primary factor of location refers to the physical location of a target term in a body of text. The location is definable as a character or word number or a point or a zone. A point is an XY coordinate which is within or on the border of the area in which the target term or feature is located. A zone is defined as any area larger than a point, such as the area occupied by a textual feature itself or the area occupied by a phrase, a clause, a sentence, a paragraph, a section, a chapter, an entire text or a collection of texts.

Information about frequency and location may be combined to produce information regarding a selected textual feature's distribution. For example, information on frequency and location can answer the question: "Does the textual feature appear more or less evenly throughout the text?". More specifically, such information can answer the questions: "Does the feature appear in one area of the text?" and "Can the influence of the textual feature be said to extend over a particular zone?" Information about frequency and location may also be combined with information about graphic attributes, phonetic attributes, meaning and/or usage. The result of which is a more refined representation of the specificity, distribution and spread of selected textual features within a text. Graphic attributes, as used herein, refer to the visual attributes of a text. Relevance is given to the size and shape of mapped textual features, the presence or absence of color, brightness, intensity, density, boldness, as well as recognizable gradations, blendings and patterns. Phonetic attributes, as used herein, refer to all sound-based attributes useful for distinguishing homographs.

Until this point, how a target term is selected has not been explained. To analyze the information contained within a body of text, statistical techniques are used to analyze all of the text features contained within the original body of text. Each text feature is analyzed on the basis of its frequency, location, graphic attributes, phonetic attributes, meaning and/or usage. For example, in the case of the exemplary body of text shown in FIG. 2, let it be assumed that there are 2300 different words and a total of 3849 word instances. Of the 2300 words, 1,920 (roughly 84%) of them occur only one time in the text. As such, 380 words occur more than once. The most frequently occurring word is "the" which occurs 287 times. The word "of" appears 130 times, "a" appears 104 times, and "and" appears 70 times. A similar listing of punctuation marks shows that there are, for example, 142 commas, 105 periods and 6 question marks. In this example, only possible nouns are considered. This is because the nouns in a body of text are the most essential in understanding the meaning of the body of text.

In order to select the textual features to be mapped in a lexiscape, a list of all possible nouns appearing in the text is compiled, and the frequency of each possible noun is noted. The possible noun list is then ranked in descending order on the basis of frequency.

After the most commonly occurring relevant words are found within a body of text, these words are then categorized so that related words can be identified. Where two or more terms are determined to be related, the term having the highest ranking on the basis of frequency may be declared the dominant word. All related terms may therein considered to be the same as the dominant word. Among the graphic attributes considered in categorizing terms are similarities in graphic structure, for example, "house", "houses" and "housing" all have in common the graphic root "hous". The usage and meaning of the words is also considered, wherein words with the same meaning are categorized as being the same. For instance, the term "housing" may or may not mean the same thing as "residence", "domicile" and/or "home". It could refer to a water pump housing. A determination as to whether terms are related is done using statistical probabilities considering the occurrence of the terms and the spread of the terms in the overall context of the body of text.

Figure 5:
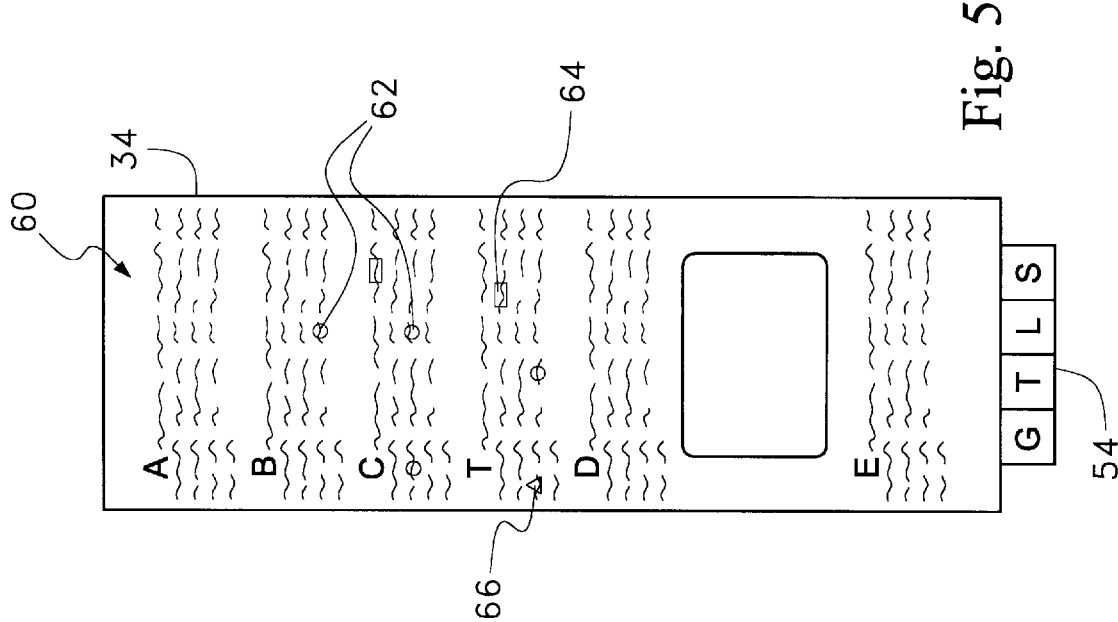
FIG. 5 shows an enlarged view of a detail typographic mapping of the text in accordance with the present invention.

Referring to FIG. 5, a lexiscape map 60 of the body of text 32 (FIG. 2) is presented. The lexiscape map 60 in FIG. 5 shows the occurrence of a target base word in the context of the map box 34. For purposes of illustration, the term "house" was selected as the target base word as well as its related terms "houses" and "housing". The location of these related words are then graphically depicted on the lexiscape map 60. The term "house" is arbitrarily assigned the graphic symbol of an oval 62. The term "houses" is arbitrarily assigned the graphic symbol of a rectangle 64. Lastly, the term "housing" is arbitrarily assigned the graphic symbol of a triangle 66. The graphic symbols of the oval 62, rectangle 64 and triangle 66 appear in the lexiscape map 60 at the positions where the terms "house", "houses" and "housing", respectively, would have appeared in the text.

The most obvious information provided by the lexiscape map 60 is the location of terms "house", "houses" and "housing" in the body of text. All three terms are located within the second, third and fourth paragraphs of the mapped text. None of the other paragraphs contain any references to "house", "houses" or "housing". On the basis of this graphic information, a person viewing the lexiscape map 60 can logically infer that the topic of house/houses/housing is discussed in the second, third and fourth paragraphs of the mapped text and is probably not discussed anywhere else.

Another piece of information provide by the lexiscape map 60 concerns the distinction between the topic "houses", the topic "house" and the topic "housing". In the shown embodiment, the terms "house", "houses" and "housing" are each symbolized differently. Because the distinction between these three terms is noted on the detail lexiscape map 60, it can be clearly seen that there is one instance of 'housing', two instances of "houses" and three instances of "house". Moreover, these instances do not appear to be clustered or segregated in any way which would suggest that "houses" is specific to one location, "housing" to another and "house" to yet another. On the basis of this information, one might reasonably infer that the sense of house/houses/housing in this context is most closely related to the notion of "home" or "domicile", and not to "water pump housing".

The lexiscape map 60 does not, however, provide information regarding the relative importance of the topic "housing", in comparison to other topics which may also be addressed in these paragraphs. The fact that "housing" is discussed is clear. The fact that it is an important topic, or even the main topic, within the context of the mapped text is not clear. The most that can be said is that the lexiscape map 60 shows that the words house/houses/housing do appear in the second, third and fourth paragraphs of the mapped text and that they are concentrated in, and thus probably specific to, the second, third and fourth paragraphs of the mapped text.

Figure 6:
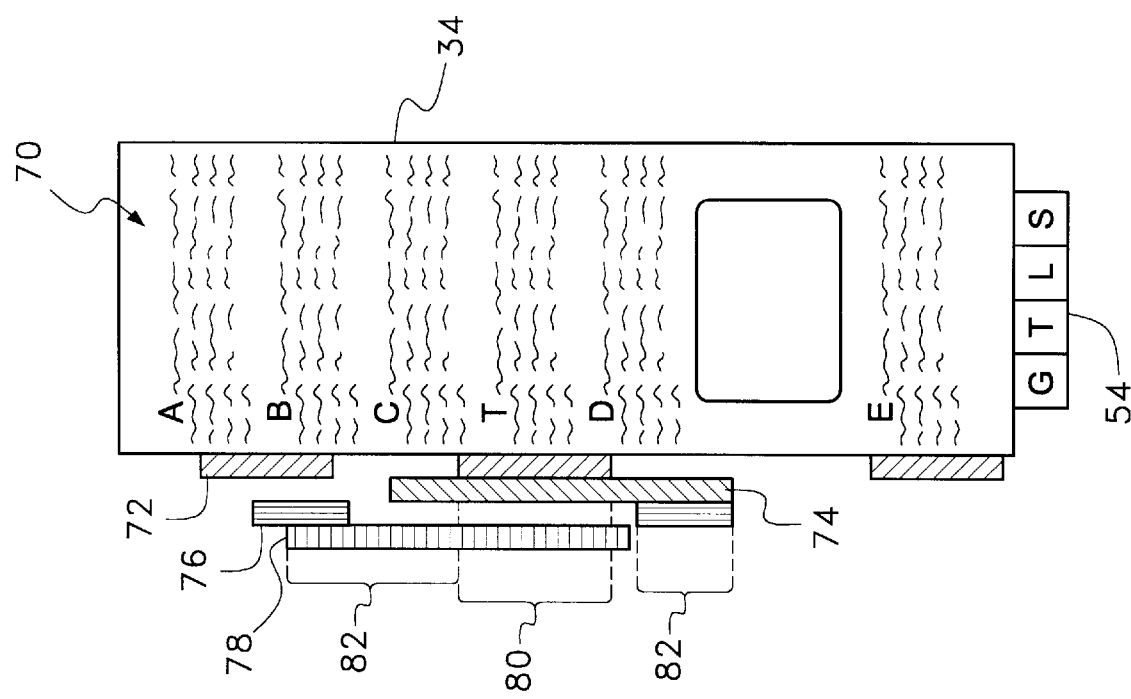
FIG. 6 shows an enlarged view of a lexigraphic mapping of the text in accordance with the present invention.

Referring to FIG. 6, it can be seen that when a user selects the "L" selection in the choice menu 54. In the "base typographic map" 70, the area of text containing the most prevalent noun is identified with an edge highlight 72 shown with an oblique hatching. The area of text containing the second most prevalent noun is identified with an edge highlight 74 shown with a reversed oblique hatching. The area of text containing the third most prevalent noun is identified with an edge highlight 76 shown with a vertical hatching. The area of test containing the fourth most prevalent noun is identified with an edge highlight 78 with a horizontal hatching. On the computer screen 30 (FIG. 6) each of the edge highlights 72, 74, 76, 78 would be identifiable by a different color rather than by a hatching scheme.

In FIG. 6, it can be seen that there are areas of overlap in the various edge highlights 72, 74, 76, 78. In certain areas, two of the edge highlights overlap. As such, it can be seen that these double overlap area contain references to two of the four most prevalent nouns. Triple overlap areas also occur. In these areas there are references to three of the four most prevalent nouns. No areas of overlap are present where all four of the most prevalent nouns occur.

From viewing the textscape map 70, It can be inferred that the areas of edge highlight overlap are the most likely to provide a reader with a quick and accurate overview of the subject discussed in the body of text. The fact that the information is in the form of a map suggests that the overview may be comprehended quickly. It is reasonable to expect that if one's goal is to gain an overview of the body of text, one will save a considerable amount of auditory-based reading time by going first to the areas of edge highlight overlap. The fact that the overview is likely to be accurate is a matter of probability based upon the multivariate statistical analysis. The results of this analysis show the following. The triple overlap areas 80 represent the only locations in the body of text in which three of the four most prevalent nouns are present. Double overlap areas 82 show areas where two of the most prevalent nouns occur. Triple overlap areas 80 and double overlap areas 82, however, by virtue of their locations within the first and last paragraphs of the text, are more likely to be useful with regard to establishing a general understanding of the subject discussed in the text than are the other block areas.

By viewing the edge highlights 72, 74, 76, 78 and the areas where the edge highlights overlap, a viewer can determine what parts of the mapped text are most likely to provide useful information. However, the viewer cannot determine the identity of the four most prevalent nouns used to create the various edge highlights 72, 74, 76, 78. By visually comparing all of the edge highlights 72, 74, 76, 78, it can be seen that all the areas of edge highlight overlap the area of the second edge highlight 74 corresponding to the second most prevalent noun. As such, all of the overlap areas of edge highlight contain references to the second most prevalent noun in conjunction with the first, third and/or fourth most prevalent nouns. Since the second most prevalent noun is the only word common to all the intersections illustrated by FIG. 6, it can be ascertained that the second most prevalent noun somehow represents the general subject matter of the mapped text. This information is ascertainable despite the fact that the first most prevalent noun occurs more often than the second most prevalent noun.

After studying the overlays, the person viewing the base typographic map 79 can be shown or told the identity of the most prevalent nouns. In the shown embodiment, the most prevalent noun is "manufacturing". The second most prevalent noun, as mentioned earlier, is "house". The third most prevalent noun is "wages" and the fourth most prevalent noun is "labor". Having previewed the text as graphic information, an individual may begin reading the words of the text as sound information with the intention of testing the inferences made by using the textmapping process. The most important inference is that the topic of this section has to do with manufacturing, housing, labor, and wages.

Statistical textmapping is a powerful tool for decoding and comprehending written texts. It may be used for a variety of tasks including both reading and writing. For example, it may be used to map a text for concepts, arguments, information and the like or to reveal the structure, organization and flow of information and concepts within a text.

By comparing different maps of the same text and looking for patterns and intersections, the reader may, without actually reading the words of the text as sound information, determine which locations are most likely to yield the main point of the text. The reader can also determine which locations are most likely to contain specific details or more developed arguments, and which locations are likely to contain minor details, information of secondary importance or digressions from the main point. By viewing maps and overlays, such as that shown by FIG. 6, a reader can see that areas with multiple highlight overlapping yield the most general information. Locations which contain very few or zero highlight overlaps are less likely to contain general information. They are, however, more likely to contain specific kinds of information, such as details, arguments, documentation and supporting quotations.

By providing a map box, a person viewing a body of text can visualize the typographic and conceptual structures of a text. By enabling that person to create different maps of the text in the map box, the present invention enables a person to understand information about the retrieved body of text prior to reading the text. With this information, a person's will know what to look for when reading the words of the text. This adds greatly to the readers comprehension and overall reading efficiency.

Referring to FIG. 7 an alternate example of the purpose of the present invention system is illustrated. In this example side-by-side comparisons are provided for different types of mappings that can be produced for a single body of text.

In the first map box 100 of FIG. 7, there is shown a base typographic map 102 corresponding to a body of text. In this example, the body of text is very large. Consequently, a map that shows each word is impractical. In the shown typograpreprese 102, each line 104 represents a paragraph in the body of text. The size of each paragraph can therefore be determined by the length of the line even though the words within the paragraphs can not be read. From the typographic map 102, it can be seen that after the title 103, the mapped body of text contains forty four textblocks-41 paragraphs, 2 of which contain more than one textblock (such as blockquotations, indicated by a slight indentation)-and one illustration 108. Additionally, from the six enlarged letters 109 positioned along the left boarder of the mapped text, it can be seen that the text contains six different sections.

The second map box 200 shows the same body of mapped text after a user has clicked on "G" below the mapped text and has created a gistscape mapping within the map box 200. The most basic purpose of the gistscape mapping shown is to answer the question; what is this text about and where do I read first to learn this information? On the gistscape mapping there are produced a number of histograms 202. The histograms 202 show the occurrence of dominant words, nouns or other targeted grammatical features that have been statistically determined to be relevant to the content of the text. If a person wanted to quickly learn what the text was about, that person could read the paragraph corresponding to the longest histogram. If that paragraph was insufficient, the paragraph corresponding to the second longest histogram could be read. This process can be repeated with subsequent paragraphs until a desired degree of comprehension is obtained. The use of the histograms helps a reader recognize and avoid reading sections of text that have little or nothing to do with the main purpose of the text.

The third map box 300 shows mapped text after a user has clicked on "T" below the mapped text and has created a typoscape mapping simply illuminates, and this makes more obvious and instantly noticeable, the existing author-defined section-structure of the text.

The fourth map box 400 shows mapped text after a user has clicked on "L" below the mapped text and has created a lexiscape mapping within the map box 400. The lexiscape mapping shows highlighted areas 402 within the text that contain terms of statistical interest. Areas where highlighted ares 402 overlap are the most likely to provide relevant information about the text when read, as has been previously explained.

The fifth map box 500 shows mapped text after a user has clicked on "S" below the mapped text and has created a searchscape mapping within the map box. Each box 502 at the right of the mapped text show the occurrence of a searched word or character string.

From the various examples given of gistscape mappings, textscape mappings, lexiscape mappings and searchscape mappings, it should be understood that numerous different types of maps can be created for each type of mapping, depending upon what type of information the user is searching for. It will also be understood that a person skilled in the art can make many variations to the exemplary embodiment of the present invention as described above. All such variations and modifications are intended to be included in the scope of the present invention as defined by the appended claims.

What is claimed is:

1. A method of managing a body of text retrieved by a computer, comprising the steps of:

displaying a portion of said text on the screen in a readable font;

displaying a map box on a screen simultaneously with said portion of said text;

displaying a text display menu that contains a plurality of different mapping formats for text;

selecting one of said plurality of different mapping formats from said text display menu; and displaying a representation of all of said body of text in said map box in the mapping format selected.

2. The method according to claim 1, further including the step of providing a movable positional indicator in said map box wherein said position indicator can be selectively moved to most any point on said representation of said text.

3. The method according to claim 2, further including the step of changing the portion of text displayed on said screen when said position indicator is moved in said map box, wherein the portion of text displayed on said screen corresponds to a portion of the representation of text identified by said position indicator in said map box.

4. The method according to claim 3, further including the step of changing the position of the position indicator on said representation of text in said text box when said portion of text displayed on said screen is changed, wherein the position of the position indicator on said representation of text corresponds to the portion of text displayed on the screen.

5. The method according to claim 1, wherein the body of text contains more than one page and the method further including the step of indicating pages on said representation of text in said map box.

6. The method according to claim 1, further including the step of prompting a user for a search query and one of said different mapping formats is a search query format that displays the location of the search query on said representation of said text in said text box.

7. The method according to claim 1, wherein one of said plurality of different mapping formats is a gistmap that indicates the statistical occurrence of target textual features in said representation of text in said map box.

8. The method according to claim 7, wherein said target textual features includes at least one of the most prominent nouns contained within said body of text.

9. The method according to claim 7, wherein said target textual features include a plurality of the most prominent nouns contained within said body of text.

10. The method according to claim 1, wherein said plurality of different mapping formats includes a lexiscape mapping format that displays the location of different target textual features in said representation of text and indicates areas within said representation of text that contain more than one target textual feature.

11. The method according to claim 10, wherein said different targeted textual features includes at least one of the most prominent nouns contained within said body of text.

12. The method according to claim 10, wherein said lexiscape map format indicates the areas in said representation of text that contain a target textual feature by color coding the areas of said representation of text that contain said target textual feature.

13. The method according to claim 12 wherein said target textual feature is at least one of the most prevalent dominant nouns in said body of text.

14. The method according to claim 10, wherein said lexiscape mapping format indicates the areas in said representation of text that contain the most target textual features.

15. The method according to claim 1, wherein said plurality of different mapping formats includes a typographic mapping format that is a reduction of said body of text in a font small enough to fit the body of text in the map box; a search scape mapping format that shows the location of searched terms in the body of text; and a lexigraph mapping format that indicates the location of relevant textual features in the body of text.

16. The method according to claim 15, wherein said plurality of different mapping formats includes a gist mapping format that indicates the statistical occurrences of selected textual features in different areas of body of text.

* * * * *